(12) United States Patent
Doherty et al.

(10) Patent No.: US 10,902,361 B2
(45) Date of Patent: Jan. 26, 2021

(54) PROJECTOR AND METHOD OF USING SAME

(71) Applicant: 3BD Designs LLC, Methuen, MA (US)

(72) Inventors: Paul Doherty, Methuen, MA (US); Chuck Salvo, Methuen, MA (US)

(73) Assignee: 3BD Designs LLC, Methuen, MA (US)

( * ) Notice: Subject to any disclaimer, the term of this patent is extended or adjusted under 35 U.S.C. 154(b) by 416 days.

(21) Appl. No.: 15/881,546

(22) Filed: Jan. 26, 2018

(65) Prior Publication Data
US 2018/0218302 A1  Aug. 2, 2018

Related U.S. Application Data

(60) Provisional application No. 62/450,912, filed on Jan. 26, 2017.

(51) Int. Cl.
*G03B 21/56* (2006.01)
*G06Q 10/06* (2012.01)
*G03B 21/62* (2014.01)

(52) U.S. Cl.
CPC ....... *G06Q 10/06311* (2013.01); *G03B 21/56* (2013.01); *G03B 21/62* (2013.01)

(58) Field of Classification Search
CPC ........ G03B 21/14; G03B 21/56; G03B 21/62; G03B 21/145; Y10T 428/14; Y10T 428/28; Y10T 428/1405; Y10T 428/1452; Y10T 428/1462; Y10T 428/1481; Y10T 428/1486; C09J 7/38; C09J 7/243; C09J 7/383
See application file for complete search history.

(56) References Cited

U.S. PATENT DOCUMENTS

| | | | | |
|---|---|---|---|---|
| 5,513,683 A | * | 5/1996 | Causa | B60C 1/00 152/209.4 |
| 5,525,383 A | * | 6/1996 | Witkowski | A47G 19/2227 206/217 |
| 8,599,483 B1 | * | 12/2013 | Weber | G03B 21/625 359/443 |
| 2008/0143966 A1 | * | 6/2008 | Mastrosimone-Gese | A63H 33/22 353/15 |
| 2014/0375957 A1 | * | 12/2014 | Apperson | G03B 21/32 353/28 |
| 2015/0291855 A1 | * | 10/2015 | Kerep | B29C 65/48 156/60 |
| 2016/0252803 A1 | * | 9/2016 | Moran | G03B 21/001 353/28 |
| 2016/0274447 A1 | * | 9/2016 | Grundhofer | G02F 1/0147 |
| 2016/0313636 A1 | * | 10/2016 | Chien | F21S 9/022 |
| 2016/0362583 A1 | * | 12/2016 | Naik | B65C 9/0006 |

* cited by examiner

*Primary Examiner* — Sultan Chowdhury

(57) ABSTRACT

This disclosure relates to a projection system in which images are projected onto a surface at close proximity to the surface. The projection systems comprise a projection portion, an attachment portion, and a stand. The systems can further comprise a film that is placed onto the surface where the image will be projected. Methods are also disclosed for the use of such systems to attain a desired behavior in an individual such as a child.

16 Claims, 9 Drawing Sheets

PROJECTOR AND METHOD OF USING SAME

FIELD

The disclosed methods and systems relate to projection technologies.

BACKGROUND

The use of projectors to project images has been known for some time. Projector technology requires a light source to generate an image onto a surface. In the early years, projection technology involved standard light sources shining through a film showing an object. With the advent of computerized projection systems, images can be generated by controlled light projection onto surfaces.

Projection systems have recently been used to produce images that shine through windows to present a fanciful image. For instance, holiday images can be shown through windows so that it appears a ghost or other mythical creature is present in a home. These novelty projection systems are placed within a room at a distance sufficient to allow for proper projection of the fanciful image.

There are issues associated with such projectors. First, the projectors must be placed at a distance from the window to allow for the image to be properly viewed. This limits the projectors to only certain rooms of the house due to the size of the room and additionally due to the light being shown such that it could disturb people in the room where the projector is being used. Second, the projector would not be effective for these reasons if one wished to use the projector in a child's room. For example, the lighting would likely distract the child if placed too far from the surface upon which the image would be projected.

SUMMARY

The present disclosure relates to a projection system in which a small, light-weight projector that can be placed in very close proximity to a window inside a building or home, such as in a child's room. For instance, the projection system can be mounted on a window sill by way of a solid substrate. In other embodiments, the projection system can be mounted directly onto a window or onto a window sill without damaging the window. The projection system can further include a film that is placed on the window such that the film picks up the image from the projector.

Aspects of the projection system disclosed herein include a projector and a film onto which an image is transmitted. In some embodiments, the film comprises a polymer selected from the group consisting of thermoplastics, thermosets, and elastomers. In other embodiments, the film comprises a polymer selected from the group consisting of high-density polyethylene, polypropylene, polystyrene, polytetrafluoroethylene, and combinations thereof. In particular embodiments, the film is an extruded polymer. In more particular embodiments, the film is clear. In even more particular embodiments, the film is adhesive to glass. In yet more particular embodiments, the film protects the surface to which it adheres.

In certain embodiments, the film has a peel adhesion of from about 15 N/m to about 40 N/m at room temperature and 50% humidity. In other embodiments, the film has a peel adhesion of from about 18.0 N/m to about 25 N/m at room temperature and 50% humidity.

In other embodiments, the film has a thickness of less than 100 μm, but greater than 1.0 μm. In some embodiments, the film has a MD or TD tensile strength from about 20 MPa to about 70 MPa. In particular embodiments, the film has a MD ultimate elongation capacity from about 600% to about 700%. In more particular embodiments, the film has a TD ultimate elongation capacity from about 500% to about 700%. In even more particular embodiments, the film has a peel force from PMMA from about 10 to about 150 grams when pulled from the surface at 180° over 25 mm.

In certain embodiments, the projector is placed within about 20 feet of the film so as to project an image onto the film. In some embodiments, the projector is placed within about 10 feet of the film. In other embodiments, the projector is placed within about 5 feet of the film or alternatively within one foot of the film.

In certain embodiments, the image projected onto the film can only be viewed from the side of the film facing the projector.

In particular embodiments, the projection system comprises a timer. The timer being configured to operate automatically the projector such that the projector projects the image only at particular times.

Disclosed herein are also methods of using the projection systems to entertain children and induce particular advantageous behaviors in individuals. The disclosed methods involve the projection system being an indicator that a child has performed a particular task and that the individual is entitled to a particular event. The projection system thus becomes not only an entertainment device that can be used in the individual's room due to the location of the projector relative to the window, but can also be useful as a behavior modification device to induce the individual to behave.

In certain embodiments, the method includes providing a projector and a film. In some embodiments, the projector is positioned within from about 1 foot to about 20 feet. In other embodiments, the projector projects an image onto the film to signal that an event shall occur because an individual performs a task. In still other embodiments, the projector is turned on upon the individual performing the certain task.

In particular embodiments, the individual is a child. In more particular embodiments, the task is selected from the group consisting of going to bed, doing chores, and performing other desirable tasks. In still more particular embodiments, the image is associated with a holiday.

DETAILED DESCRIPTION

The disclosed projection systems involve projection of images onto a window, and in some cases over short distances. The disclosed projection systems can be used in a variety of locations of the home, including a child's room, to project an image onto a window. For this reason, in part, the projection systems can further be used to allow for entertaining a child and inducing the child to perform certain tasks, such as going to bed at an appropriate time on Christmas Eve, other holidays, or during special events.

Figure 1:
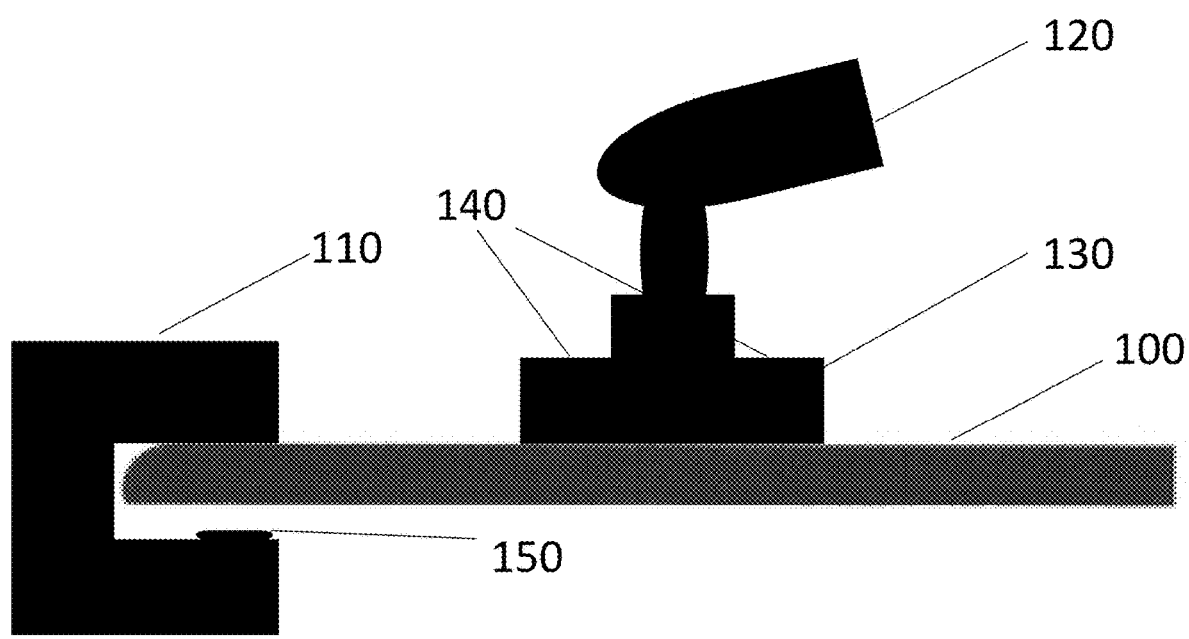
FIG. 1 is a representation of the solid substrate that is attached to the device in combination with a bracket.

The disclosed projection systems can include a projection device and a film upon which the projection device projects an image. In some embodiments, the projection device is attached to a solid substrate. FIG. 1 shows a solid substrate 100 that can be attached to the projection device (not shown). The solid substrate can further comprise a bracket 110 that connects to a surface such as a window sill. The substrate 100 can be made of plastic, wood, metal, or other sturdy material. The solid substrate 100 can support the projection system within close proximity to a window. In certain embodiments, the projection device 120 is attached directly to the solid substrate 100 through a stand 130. In certain embodiments, the projection device 120 is attached by a plunger or through other known techniques. The stand 130 is bolted to the substrate by way of screws at positions 140. It should be noted that the stand 130 could also be attached by way of adhesives such as tape or glue, nails, or bolts. In some embodiments, the solid substrate 100 is attached to a window sill by way of a bracket 110. In particular embodiments, the bracket 110 comprises pads 150 to prevent damage to the surface which it is attached and to prevent slipping on the surface.

Figure 2:
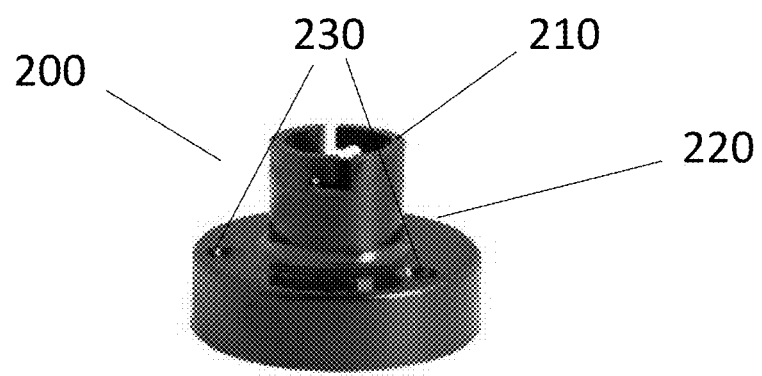
FIG. 2 is a representation showing an exemplary stand of the claimed systems.
Figure 3:
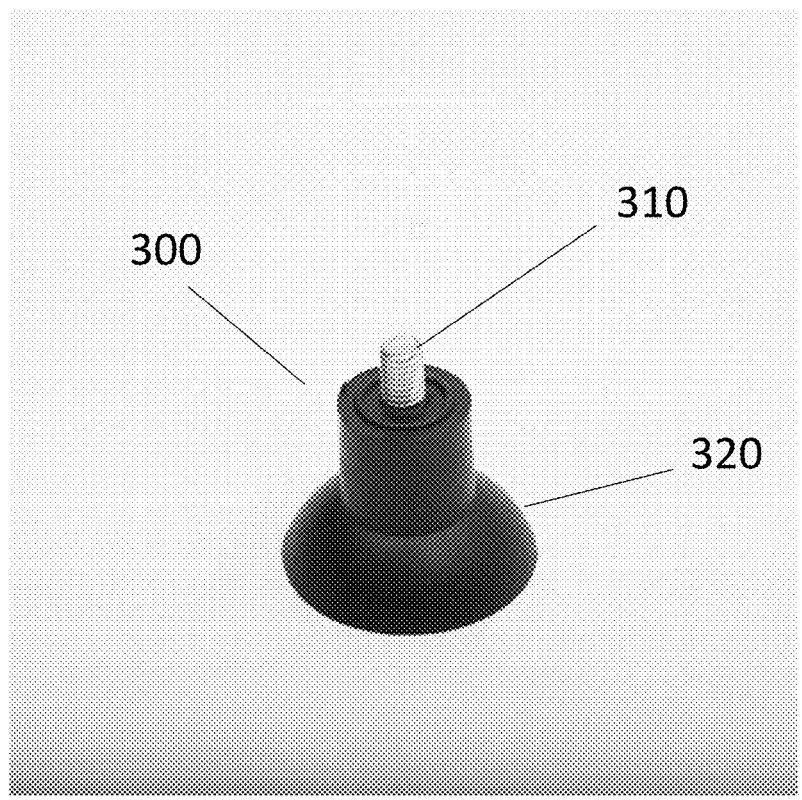
FIG. 3 is a representation showing an exemplary attachment portion used in the disclosed system.

In certain embodiments, the projection device comprises a stand and an attachment portion. FIGS. 2 and 3 show an example of a stand and an attachment portion of the projection system (a suction cup in this embodiment). FIG. 2 shows a stand 200 that can be attached to the project device of the projection system as shown in FIG. 1. The stand 200 comprises a portion 210 that locks onto the projection device. It also comprises a base 220 defining holes 230 that can receive screws or other securing agents for use in securing the stand 200 to the substrate of FIG. 1 or other solid surface. The stand 200 can be molded out of a single block of material. The stand 200 can be affixed to the projection device to allow for extension of the projection device from a surface such as a window sill or other surface (e.g., the solid substrate). FIG. 3 shows an attachment portion 300 that can be a suction cup. In FIG. 3, the attachment portion 300 comprises a threaded bolt 310 that allows for the attachment portion 300 to be received by the stand 200 from FIG. 2. In other embodiments, the attachment portion 300 directly screws into the projection device. The suction cup portion 320 attaches to a solid surface. The attachment portion 300 can further be an adhesive or other means to attach the projection system securely to a window or other surface. In some embodiments, the other surface is in close proximity (e.g., less than 2 feet) to the window in which the image is to be projected.

Figure 4:
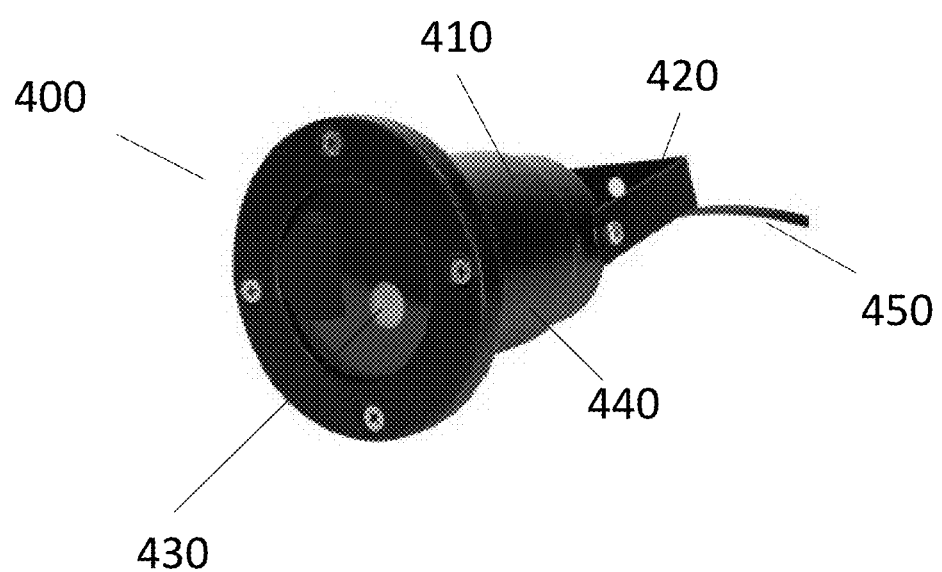
FIG. 4 is a representation showing an exemplary projection device in the projector system.

FIG. 4 shows an example of a projection device 400 of the projector system. The projection device 400 in FIG. 4 comprises a projector 410 and an arm 420. FIG. 4 allows for the arm 420 to attach to the solid substrate of FIG. 1, and the solid substrate can attach to another surface near a window, such as a window sill. In addition, the projection device comprises one or more light sources 440 that can project an image on a surface. Examples of light sources include incandescent, LED, OLED, and laser. Furthermore, the projection device can comprise a power cord 450 to supply power to the device. In other embodiments, the power source can be supplied by a battery supply located either within a chamber in the device 400 or in a pack located outside of the device 400. The projection device 400 further comprises an aperture 430 that allows light to be shown on a surface from the light sources 440. In certain embodiments, the aperture 430 can be adjusted to either increase the size of the image on the surface or to decrease the size of the image on the surface. Furthermore, the aperture 430 can be adjusted to improve the resolution.

Figure 5:
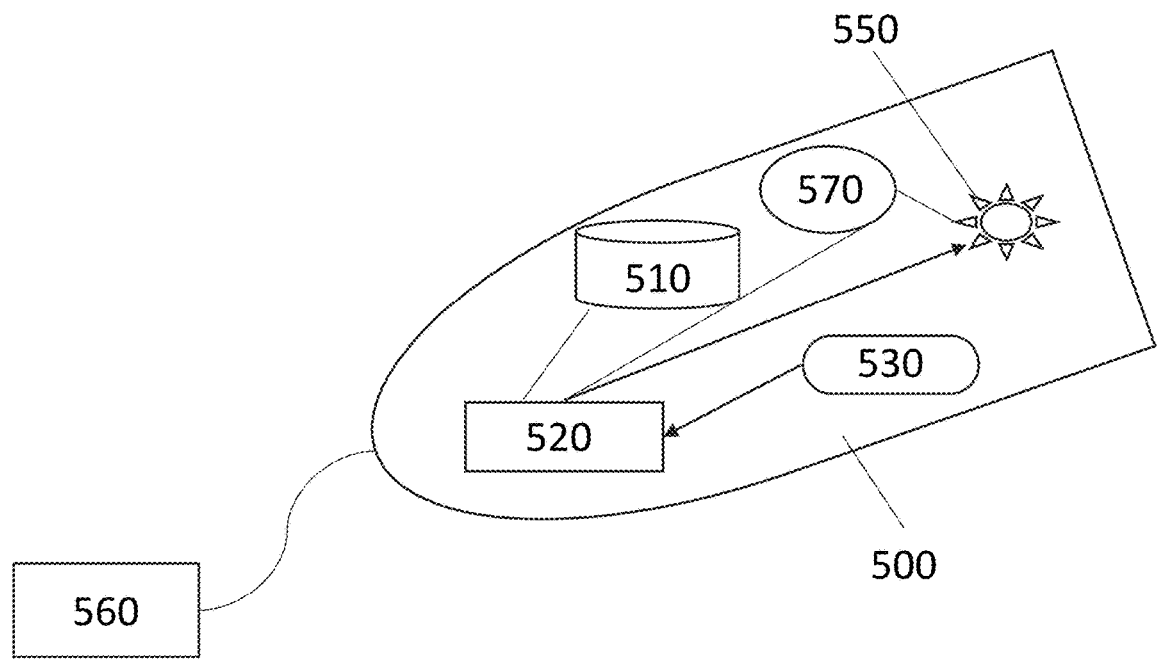
FIG. 5 shows how an exemplary system controls and projects an image.
Figure 6A:
FIG. 6a is a representation of an image that can be shown.
Figure 6B:
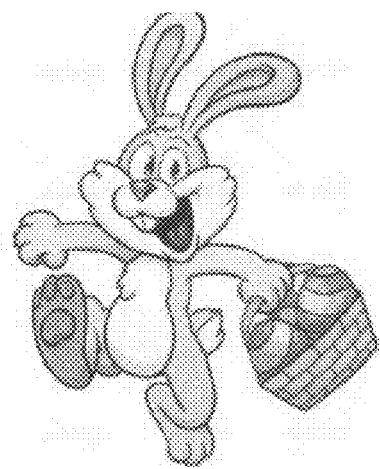
FIG. 6b is a representation of an image that can be shown.
Figure 6C:
FIG. 6c is a representation of an image that can be shown.

In further embodiments, the projection device 500 comprises one or more memories 510 that allow for storage of images into the projection device 500 (FIG. 5). For instance, the projector device can be programmed to have the images shown in FIGS. 6a-6c. The memories 510 can further store executable code to allow for a processor 520 to access the images stored in the memories 510 based on a command from a user interface 530. The user interface 530 can be a touchscreen, switch, push button, or dial. The memories 510 can also comprise executable code for storing information relating to the time of day, automatic shutdown of the device, or turning the device on based on the time of day. In some embodiments, the processor accesses a timer 540. In other embodiments, the processor 520 identifies a time and accesses instructions relating to the particular time. In still other embodiments, the time identified through access to the timer 540 indicates that the lights should be in a particular state. For example, the processor 520 can determine whether the lights 550 should be on or off. In some embodiments, the disclosed projection systems can comprise either a battery to power the systems or a power pack 560 that can be plugged into an electrical outlet.

In certain embodiments, the projection device 500 comprises a motion detector 570 for determining whether there is movement in a room. The motion detector 570 communicates with the processor 520 when motion is detected. The processor 520 can shut off lights 550. In some embodiments, the projection device 500 shuts down when movement is detected in the room by the movement detector 570. For instance, if a child gets out of bed, the projection device 500 shuts off and the image is no longer available. The child is thus induced to return to bed so that the image will return. This behavior can be advantageous during certain times of year—such as on Christmas Eve.

In certain embodiments, the design of the projector is to allow for very close projection of an image to a screen. The projector is configured to show images at very close proximity to a surface such as a window. For instance, the projector can be placed on a window or on a window sill. The projector can further be placed on surfaces close in proximity to the window of interest. The projector can thus be used without disturbing people in the room of use. This is of interest due to one use of such projectors being in rooms where children will be sleeping. In further embodiments, the arm of the projection system allows for positioning of the projector to maximize both resolution and size of the image during close proximity projection.

The projection systems disclosed herein further can be of sufficiently light weight to allow the projection systems to be positioned securely on a window without damaging the window. In some embodiments, the disclosed projection systems are less than 2 pounds in weight. In other embodiments, the projection systems are between 1.5 and 2 pounds. In still other embodiments, the projection systems are around 1.5 pounds.

Figure 7:
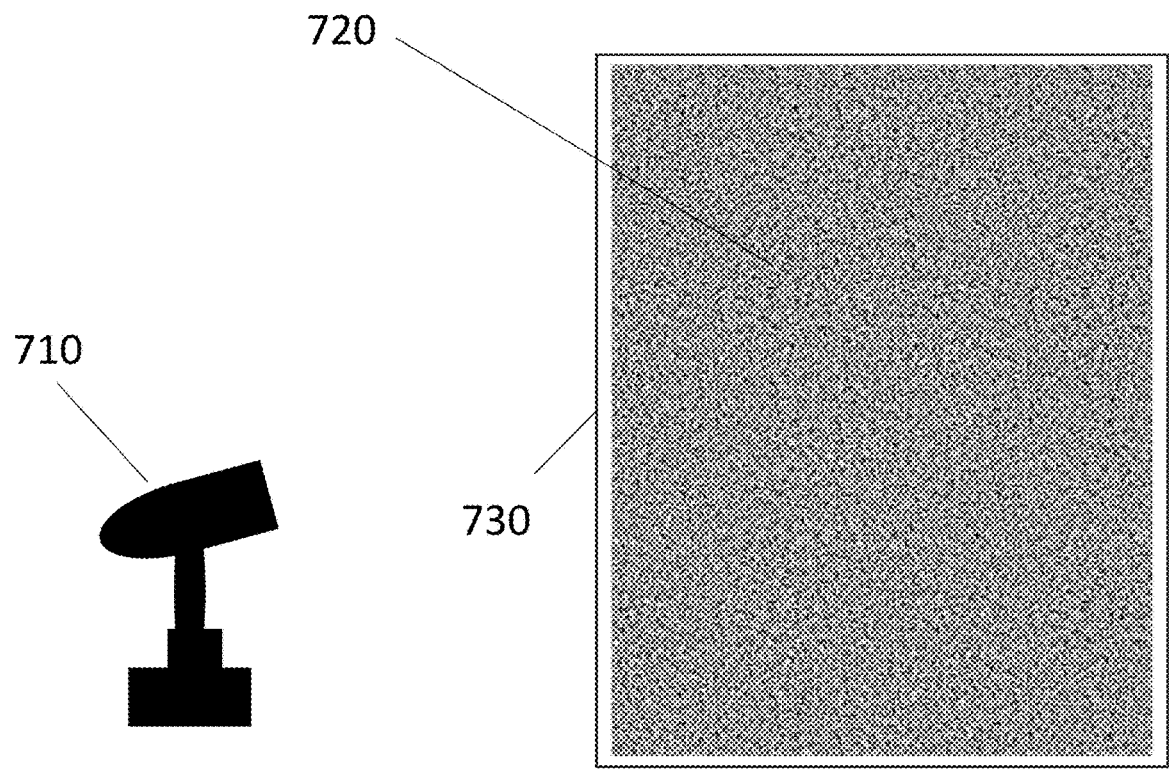
FIG. 7 is a representation of the entire projection system.

As shown in FIG. 7, the projection systems 700 disclosed herein include a projection device 710 and a film 720 upon which an image can be displayed. The film 720 can be a material that allows for the projection of the image on a window 730. In some embodiments, the film 720 allows for the image to be viewed from within the room as well. In still other embodiments, the film 720 is relatively transparent so that when the projection system is not in use, the window 730 is not obstructed by the film 720.

In some embodiments, the film 720 comprises a polymer selected from the group consisting of thermoplastics, thermosets, and elastomers. In other embodiments, the film 720 comprises a polymer selected from the group consisting of high-density polyethylene, polypropylene, polystyrene, polytetrafluoroethylene, and combinations thereof. In particular embodiments, the film 720 is an extruded polymer. In more particular embodiments, the film 720 is clear. It should be noted that the film 720 can have an adhesive layer or an adhesive quality that allows the film 720 to adhere to a surface such as glass, thermoplastic, plaster, or dry wall. In yet more particular embodiments, the film 720 protects the surface to which it adheres.

Due to the nature of the film 720, it should be stably associated with the surface and provide the additional benefit of protecting the surface from damage. This is due to the likelihood that children seeing the images may attempt to touch the image, thereby running the risk of scratching or harming the surface. In some embodiments, the film 720 has a peel adhesion of from about 15 N/m to about 40 N/m at room temperature and 50% humidity. In other embodiments, the film has a peel adhesion of from about 18.0 N/m to about 25 N/m at room temperature and 50% humidity. Peel adhesion can be determined using methods known in the art (see, e.g., Harmonized International Standard at world wide web at pstc.org/files/public/101 dot pdf).

The disclosed projection systems have films that can have a thickness of less than 100 μm, but greater than 1.0 μm. Furthermore, the characteristics of the films can have a tensile strength to prevent damage to the films, such as pulling or grabbing by children. In some embodiments, the film has a MD or TD tensile strength from about 20 MPa to about 70 MPa. In particular embodiments, the film has a MD ultimate elongation capacity from about 600% to about 700%. In more particular embodiments, the film has a TD ultimate elongation capacity from about 500% to about 700%. In even more particular embodiments, the film has a peel force from PMMA from about 10 to about 150 grams when pulled from the surface at 180° over 25 mm.

In certain embodiments, the projection device is placed within about 20 feet of the film so as to project an image onto the film. In some embodiments, the projector is placed within about 10 feet of the film. In other embodiments, the projector is placed within about 5 feet of the film or alternatively within one foot of the film.

The projection systems disclosed herein can be used in methods for enabling a child to exhibit behaviors that are desired at particular times. Aspects of the disclosed methods include projecting an image onto a window when a child has exhibited the behavior of interest and maintaining the projected image for the time that the child continues to exhibit the behavior of interest. The methods can further comprise teaching the child that the projected image will signal to a mythical figure such as Santa Claus that the child is behaving in a desired way. The child associates the signal with the mythical figure and the need to perform a task so that the mythical figure will arrive. For instance, the child can see an image of the tooth fairy and learn that going and staying in bed will allow the tooth fairy to come. When the child performs the task, the image can be shut off or alternatively left on for the child. For example, the child can be taught that the image will turn on when the child goes to bed and stays in bed.

The projection system can be turned on when the child achieves the desired behavior. In some embodiments, the desired behavior is to go to sleep so that the mythical figure will show up and perform its duties. As noted above, the projection system can comprise motion detection such that if the child misbehaves (stays awake) the image is shut off. When the child ceases the misbehavior (staying awake), the projection system starts again. Note that this technique can be used to achieve any particular behavior desired.

In certain embodiments, the method includes providing a projector and a film. In some embodiments, the projector is positioned within from about 1 foot to about 20 feet. In other embodiments, the projector projects an image onto the film to signal that an event shall occur because an individual performs a desired task. In still other embodiments, the projector is turned off upon the individual fails to perform the certain task.

In particular embodiments, the individual is a child. In more particular embodiments, the task is selected from the group consisting of going to bed, doing chores, and performing other desirable tasks. In still more particular embodiments, the image is associated with a holiday.

It should be noted that the use of the term "a" or "an" means "one or more" throughout this application unless explicitly described otherwise. As used herein, the term "about" means+/−10% of the shown value that the term about modifies.

EQUIVALENTS

Those skilled in the art will recognize, or be able to ascertain, using no more than routine experimentation, numerous equivalents to the specific embodiments described specifically in this disclosure. Such equivalents are intended to be encompassed in the scope of the following claims.

We claim:

1. A projection system comprising a projection device and a film, the projection device comprising a projector and a stand, wherein the projection system is configured to generate an image on the film, wherein the film has a peel force from PMMA from about 10 to about 150 grams when pulled from the surface at 180° over 25 mm.

2. The projection system of claim 1, wherein the film comprises a polymer selected from the group consisting of thermoplastics, thermosets, and elastomers.

3. The projection system of claim 1, wherein the film comprises a polymer selected from the group consisting of high-density polyethylene, polypropylene, polystyrene, polytetrafluoroethylene, and combinations thereof.

4. The projection system of claim 1, wherein the film is an extruded polymer.

5. The projection system of claim 1, wherein the film is clear and the film is adhesive to glass.

6. The projection system of claim 1, wherein the film protects the surface to which it adheres.

7. The projection system of claim 1, wherein the film has a thickness of less than 100 μm, but greater than 1.0 μm.

8. The projection system of claim 1, wherein the projector is placed within about 20 feet of the film so as to project an image onto the film.

9. The projection system of claim 1, wherein the projector is placed within about 5 feet of the film or alternatively within one foot of the film.

10. The projection system of claim 1, wherein the projection system comprises a timer being configured to operate automatically the projector such that the projector projects the image only at particular times.

11. The projection system of claim 1, wherein the film protects the surface to which it is affixed.

12. The projection system of claim 1, wherein the projection device comprises one or more memories storing executable code.

13. The projection system of claim 1, wherein the projection device comprises a processor to access one or more images stored in the memories.

14. The projection system of claim 1, wherein the projection device comprises a user interface.

15. The projection system of claim 1, wherein the projection device comprises a timer.

16. A projection system comprising a projection device and a film, the projection device comprising a projector and a stand, wherein the projection system is configured to generate an image on the film, wherein the projection device comprises executable code for controlling the intensity of light from the projection system, for controlling the aperture, for accessing an image, for controlling a time of showing an image, or combinations thereof.

* * * * *